United States Patent
Paul et al.

(10) Patent No.: US 10,540,625 B2
(45) Date of Patent: Jan. 21, 2020

(54) APPROXIMATE COMPUTING FOR APPLICATION PERFORMANCE IN HETEROGENEOUS SYSTEMS

(71) Applicant: Tata Consultancy Services Limited, Mumbai (IN)

(72) Inventors: Himadri Sekhar Paul, Kolkata (IN); Arijit Mukherjee, Kolkata (IN); Arpan Pal, Kolkata (IN); Ansuman Banerjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 289 days.

(21) Appl. No.: 15/654,151

(22) Filed: Jul. 19, 2017

(65) Prior Publication Data

US 2018/0025301 A1 Jan. 25, 2018

(30) Foreign Application Priority Data

Jul. 22, 2016 (IN) .............................. 201621025212

(51) Int. Cl.
*G06Q 10/06* (2012.01)
*G06F 9/50* (2006.01)
*G06Q 10/04* (2012.01)

(52) U.S. Cl.
CPC ....... *G06Q 10/0633* (2013.01); *G06F 9/5066* (2013.01); *G06Q 10/04* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 5,408,663 A | * | 4/1995 | Miller | G06Q 10/06 718/104 |
| 6,567,640 B2 | | 5/2003 | Binns et al. | |
| 6,567,840 B1 | * | 5/2003 | Binns | G06F 9/4887 718/100 |
| 6,765,596 B2 | * | 7/2004 | Lection | G06F 3/0482 715/764 |
| 7,155,400 B1 | * | 12/2006 | Jilk | G06Q 10/06 705/7.14 |
| 7,159,218 B2 | * | 1/2007 | Abe | G06F 9/4881 718/102 |
| 7,895,071 B2 | * | 2/2011 | Khosla | G06F 9/4881 705/7.12 |

(Continued)

FOREIGN PATENT DOCUMENTS

CN  105242966  1/2016

*Primary Examiner* — Alan S Miller
(74) *Attorney, Agent, or Firm* — Finnegan, Henderson, Farabow, Garrett & Dunner LLP

(57) ABSTRACT

A system and method for determining a configuration of a plurality of tasks to meet the specified deadline of a linear workflow of a real-time heterogeneous network. Often times, while meeting expected application performance in the heterogeneous network, it may possible to have graceful degradation of quality for ensuring timing constraints at the same time. In a multi-layered architecture, where each layer is equipped with multiple computational resources, the time optimization for each of the plurality of tasks can be achieved through approximate computing and analyzing all possible configurations of each task in a workflow within a particular layer.

9 Claims, 4 Drawing Sheets

(56) References Cited

U.S. PATENT DOCUMENTS

| | | | | |
|---|---|---|---|---|
| 8,732,714 | B2* | 5/2014 | Vaidya | G06F 9/4881 |
| | | | | 718/103 |
| 8,959,370 | B2* | 2/2015 | Zomaya | G06F 1/3203 |
| | | | | 713/320 |
| 9,361,155 | B2* | 6/2016 | Chandhoke | G06F 9/4887 |
| 9,372,729 | B2* | 6/2016 | Fecioru | G06F 9/4881 |
| 9,384,053 | B2* | 7/2016 | Suzuki | G06F 9/5027 |
| 9,705,817 | B2* | 7/2017 | Lui | H04L 67/10 |
| 9,942,235 | B2* | 4/2018 | Bagasra | H04L 63/101 |
| 2002/0140742 | A1* | 10/2002 | Lection | G06F 3/0482 |
| | | | | 715/835 |
| 2003/0018512 | A1* | 1/2003 | Dortmans | G06Q 10/06 |
| | | | | 718/100 |
| 2006/0248461 | A1* | 11/2006 | Yamada | G06N 5/043 |
| | | | | 715/706 |
| 2007/0055558 | A1* | 3/2007 | Shanahan | G06Q 10/06 |
| | | | | 705/7.26 |
| 2008/0276262 | A1* | 11/2008 | Munshi | G06F 8/41 |
| | | | | 719/328 |
| 2009/0112677 | A1* | 4/2009 | Rhett | G06Q 10/06 |
| | | | | 705/7.21 |
| 2010/0262559 | A1* | 10/2010 | Wilcock | G06Q 10/00 |
| | | | | 705/348 |
| 2011/0239017 | A1* | 9/2011 | Zomaya | G06F 1/3203 |
| | | | | 713/320 |
| 2015/0163289 | A1* | 6/2015 | Paul | H04L 67/02 |
| | | | | 709/201 |
| 2016/0112341 | A1* | 4/2016 | Lui | H04L 67/10 |
| | | | | 709/226 |
| 2017/0364389 | A1* | 12/2017 | Naganathan | G06F 9/4887 |
| 2017/0371714 | A1* | 12/2017 | Munshi | G06F 8/314 |

\* cited by examiner

APPROXIMATE COMPUTING FOR APPLICATION PERFORMANCE IN HETEROGENEOUS SYSTEMS

PRIORITY CLAIM

This U.S. patent application claims priority under 35 U.S.C. § 119 to India Application No. 201621025212, filed on Jul. 22, 2016. The entire contents of the aforementioned application are incorporated herein by reference.

TECHNICAL FIELD

The embodiments herein generally relate to a system and method for determining a configuration of a plurality of tasks to meet the specified deadline of a linear workflow of a real-time heterogeneous network and, more particularly, a system and method using an approximate computing technique to ensure the timing constraints and optimizing quality of output of the plurality of tasks of a heterogeneous network.

BACKGROUND

Internet of Things (herein after read as IoT) has rose to prominence over the recent decade. Industry and academia alike subscribe to the grand vision it projects and have been investing in it heavily. Although, the industries are ready with all the basic components and technologies that IoT requires. But still the industry lacks in interfacing, composing, integrating and configuring them into a single working system remains a major challenge. IoT applications are inherently distributed and often possess several non-trivial constraints. On one hand, there are constraints on timely execution of applications utilizing various compute elements in the IoT stack. As an example, real time constraints are most naturally implied for applications which require to generate actuation signals based on events detected using environmental sensors. On the other hand, effective energy utilization remains an elusive challenge as well.

An additional complexity in the IoT context is posed by the extreme dynamism of the underlying infrastructure. The application therefore, needs to dynamically adapt to varying availability of compute resources at various IoT layers. The variation of the resources may pose interesting optimization challenges for application execution in this heterogeneous infrastructure. Often times, the trade-off is between meeting expected application performance as well as guaranteeing quality, and ensuring timing constraints at the same time. This often necessitates graceful degradation of quality of output within acceptable limits to meet associated deadlines and guaranteeing an expected level of performance.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for determining a configuration of a plurality of tasks to meet the specified deadline of a linear workflow of a real-time heterogeneous network.

In one object, a system for determining a configuration of a plurality of tasks to meet the specified deadline of a linear workflow of a real-time heterogeneous network. The system comprises a processor, a memory communicatively coupled to the processor and the memory contains instructions that are readable by the processor, a task consideration module is configured to select a task from the plurality of tasks in the linear workflow of the real-time heterogeneous network, a realization module is configured to consider a realization from a plurality of realizations of the selected task, wherein the plurality of realizations approximate errors of the selected task and a relative quality among the plurality of realizations of the selected task, a configuration analyzing module is configured to analyze a plurality of configurations for the selected task, wherein each of the plurality of configurations depends on a plurality of implementations and a plurality of physical parts of the heterogeneous network and a decision module is configured to estimate the execution time for each of the analyzed plurality of configurations. Further the decision module determines a configuration for the selected task based on the least execution time estimation for each of the plurality of tasks to meet the specified deadlines of the workflow of a real-time heterogeneous network.

In another object, a method for determining a configuration of a plurality of tasks to meet the specified deadline of a linear workflow of a real-time heterogeneous network. The method comprising steps of selecting a task from the plurality of tasks in the linear workflow of the real-time heterogeneous network using a task consideration module, considering a realization from a plurality of realizations of the selected task using realization module, wherein the plurality of realizations approximate errors of the selected task and a relative quality among the plurality of realizations of the selected task, defining a realization index based on the considered realization of the selected task of the linear workflow, analyzing a plurality of configurations for the selected task using a configuration analyzing module, wherein each of the plurality of configurations depends on a plurality of implementations and a plurality of physical parts of the heterogeneous network, estimating execution time for each of the analyzed plurality of configurations using a decision module and determining a configuration for the selected task based on the least execution time estimation for each of the plurality of tasks to meet the specified deadlines of the workflow of a real-time heterogeneous network.

It would be appreciated that among the plurality of realizations of a task, the one with higher accuracy takes higher execution time than the one with lower accuracy.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
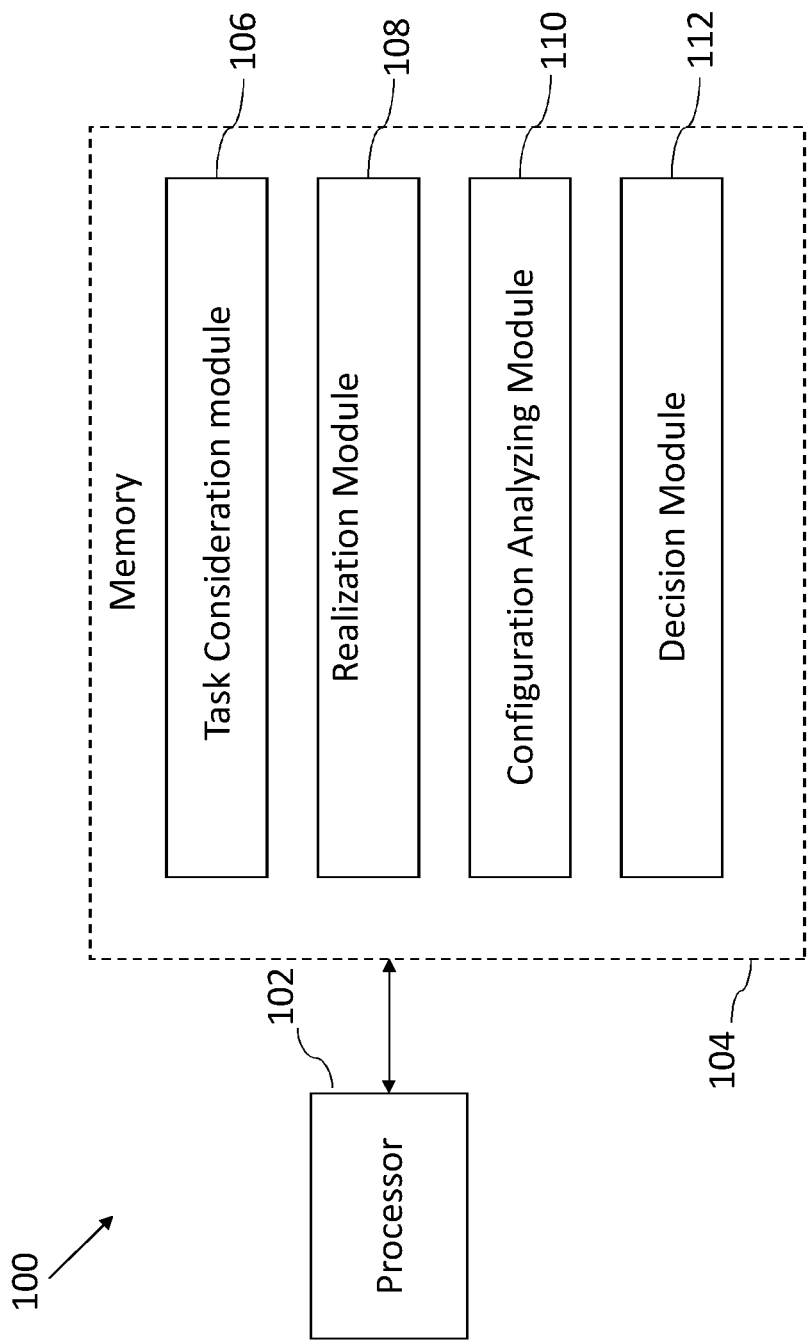
FIG. 1 illustrates a system for determining a configuration of a plurality of tasks to meet the specified deadline of a linear workflow of a real-time heterogeneous network according to an embodiment of the present disclosure.

Referring FIG. 1, a system 100 for determining a configuration of a plurality of tasks to meet the specified deadline of a linear workflow of a real-time heterogeneous network. The system 100 comprising a processor 102, a memory 104 communicatively coupled to the processor 102, a task consideration module 106, a realization module 108, a configuration analyzing module 110 and a decision module 112. The system 100 receives various measured values from the profiler and tries to optimize the objective functions based on the received measured values. The profiler monitors the execution time of the plurality of tasks in the workflow and these monitored values are used as an input to the system 100.

In the preferred embodiment, the task consideration module 106 is configured to select a task from the plurality of tasks in the linear workflow of the real-time heterogeneous network. In the heterogeneous network an application consists of the plurality of tasks, some of which may be bound to specific layers, while the rest are free to be executed on any layer. Each task of the plurality of tasks has different realizations with different execution time on different layers. Consecutive tasks, if executed on different layers, involve transfer of data from the producer task to the consumer task. A synergistic execution framework needs to harness the cumulative capabilities of different compute elements to achieve best execution performance.

In the preferred embodiment, the realization module 108 is configured to consider a realization from a plurality of realizations of the selected task, wherein the plurality of realizations approximate errors of the selected task and a relative quality among the plurality of realizations of the selected task. Quality of a realization is specific to the functionality of the application and also the manner through which the order of operations are realized. Usually, the best possible realization is fixed to have the highest quality of the each task, but the other realizations may add some element of inexactness to the computation and produce outputs with different orders of variations from the accurate one.

In an example of a floating point addition operation on two real number. Where the output of the addition operation is more accurate than its approximate version which replaces the accurate output with an integer addition operator, but the less accurate output is faster than accurate output. Let two functions $f$ and $g$ of a workflow are composed as $g \oplus f$. The quality order of the composition on different realizations of the functions can be defined as follows. Let $f$ has two realizations $f(1)$ and $f(2)$ and $g$ as $g(1)$ and $g(2)$. Let $f(1) > f(2)$ i.e., $f(1)$ is more precise than $f(2)$ in terms of quality of output. Also, $g(1) > g(2)$. A relative order of composition can be defined as $g(1) \oplus f(1) > g(1) \oplus f(2) > g(2) \oplus f(2)$. However the order among compositions $g(1) \oplus f(2)$ and $g(2) \oplus f(1)$ cannot be generically defined and is only application specific. If the quality model is additive in nature then they are equivalent i.e., $g(1) \oplus f(2) \sim g(2) \oplus f(1)$. Further, if in the given two functions, the function $f$ adds input numbers as integers and $g$ multiplies a constant value with the input number. Then, in the composition $g \oplus f$ the error of the composition is proportional to that introduced by the conversion by $f$. The notion of composition in this case is additive.

In the preferred embodiment, the configuration analyzing module 110 is configured to analyze a plurality of configurations for the selected task, wherein each of the plurality of configurations depends on a plurality of implementations and a plurality of physical parts of the heterogeneous network. Analysis of the plurality of configurations on account of the execution time of the workflow. The execution time of the workflow is computed as the cost of the longest path in the graph, where the cost of the task is defined as the execution time for a configuration. Thus, the selection of a configuration is considered on the cost of highest order of quality of the composition of the plurality of tasks in the workflow.

In the preferred embodiment, the decision module 112 configured to estimate the execution time for each of the analyzed plurality of configurations, further wherein the decision module determines a configuration for the selected task based on the least execution time estimation for each of the plurality of tasks to meet the specified deadlines of the workflow of a real-time heterogeneous network. There are two essential components in each of the architecture layers. The system 100 tries to optimize the execution time based on the various measured values which are received from the profiler. Since the execution time of the heterogeneous network is dynamic, the optimal configuration of the workflow is variable. To handle this dynamism, the system 100 determines the configuration at every task invocation point in the workflow.

In an example, where the system 100 applying a brute-force search technique to estimate execution time of an application and expedite the search task. Let's consider the workflow is linear and the path is s→d. The application works on a recursive routine, where each recursive step tries to determine the best configuration for the search task at each task i.e. n. In the recursive routine at each step the system divides the path in more than one sub-paths. The system 100 estimates the execution time of each sub-path of the configuration at task n. Therefore, the system 100 selects the best configuration for the task n based on the estimated execution time and quality of the output.

Figure 2:
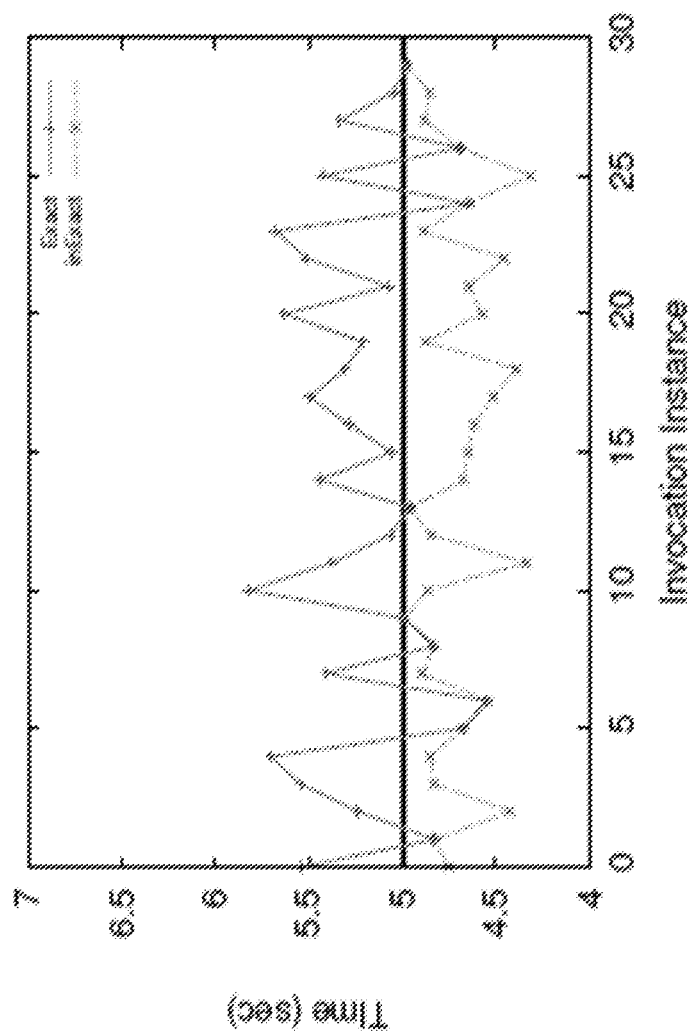
FIG. 2 is a schematic diagram of an example to show comparison of execution times for the fire evacuation workflow, according to an embodiment of the present disclosure.
Figure 3:
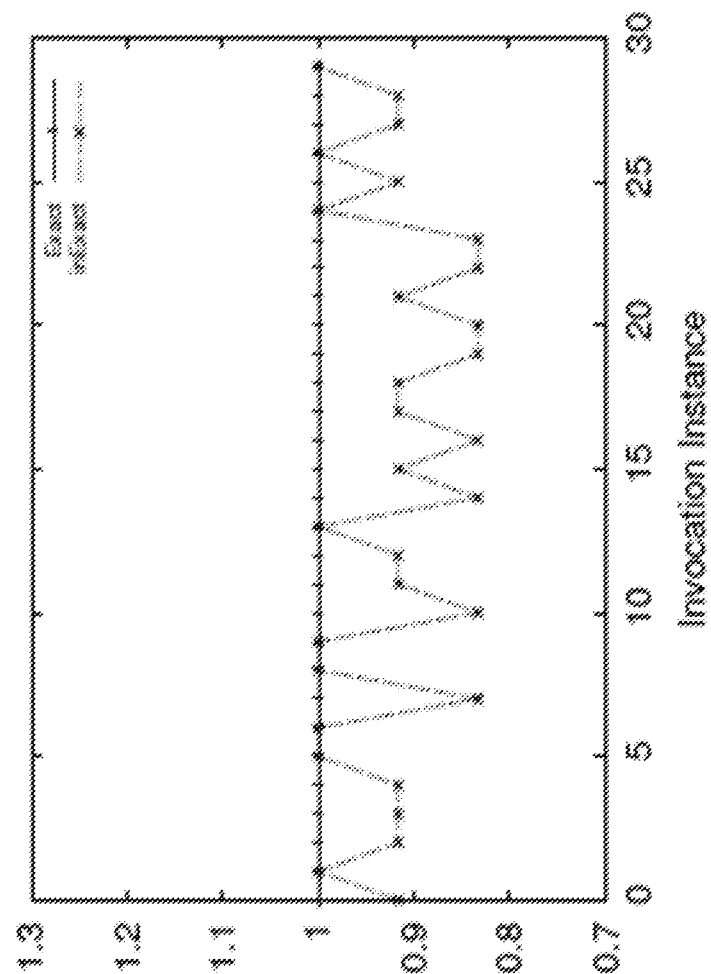
FIG. 3 is a schematic diagram of an example to show comparison of quality of realizations for the fire evacuation workflow, according to an embodiment of the present disclosure.

In another example as shown in FIGS. 2 and 3, shows the comparison of execution times and quality for the fire evacuation workflow of an emergency evacuation assistance application. The emergency evacuation assistance application which helps user in its safe exit from a building during emergency situations like fire in the building. The building is equipped with temperature sensing equipments for monitoring heating, ventilating and air conditioning (HVAC) installation. All the floors of the building are under surveillance system using closed-circuit television (CCTV) arrangement. A fire monitor component is a pertinent workflow which analyzes data feeds from these sensors. In this example, the most compute intensive tasks in this workflow are localization and path planning. The deadline of the workflow was set to five seconds. The system selects lesser quality realizations to achieve the result within the specified deadline.

Figure 4:
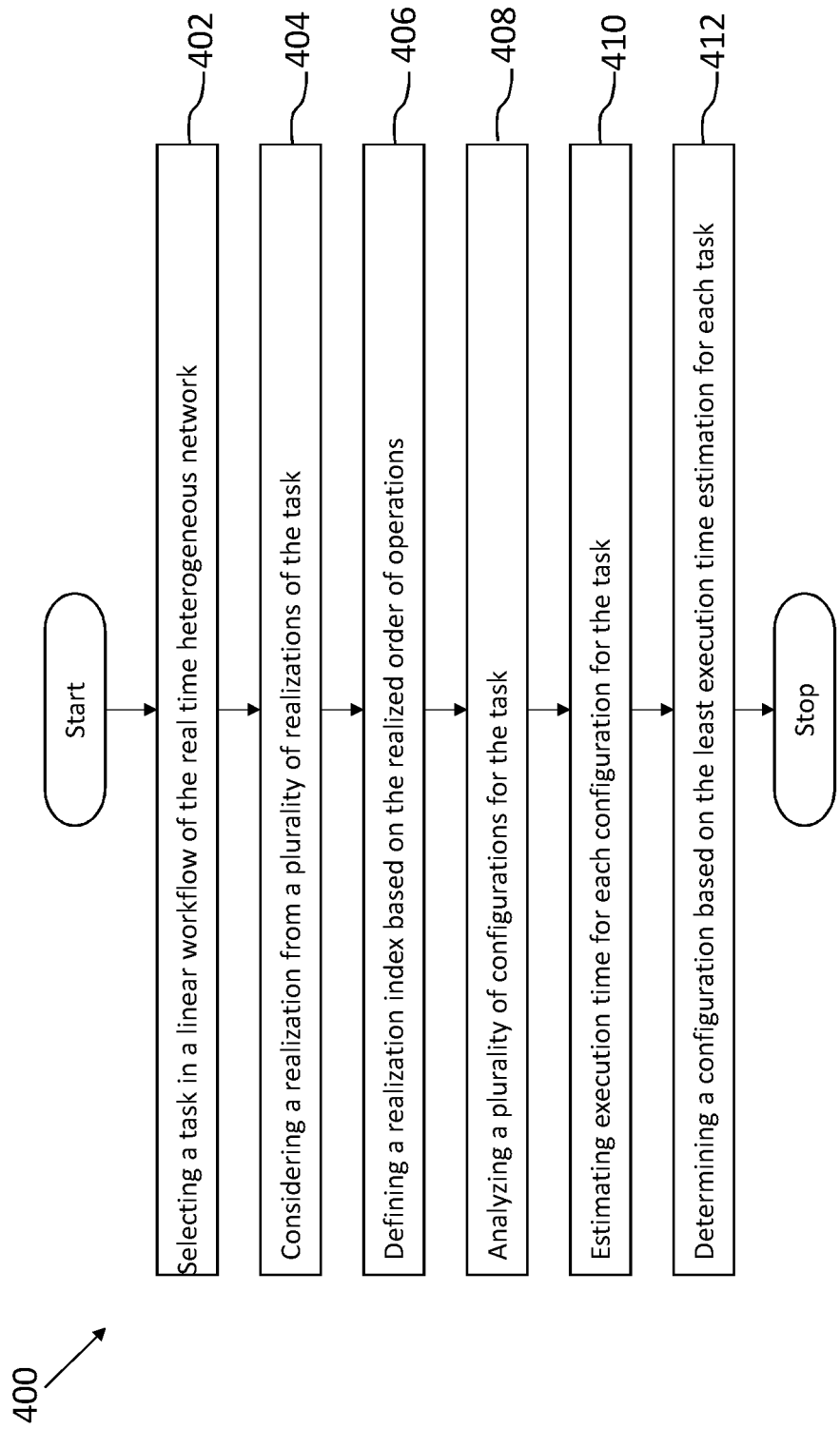
FIG. 4 illustrates a method for determining a configuration of a plurality of tasks to meet the specified deadline of a linear workflow of a real-time heterogeneous network according to an embodiment of the present disclosure.

Referring FIG. 4, a method 400 for determining a configuration of a plurality of tasks to meet the specified deadline of a linear workflow of a real-time heterogeneous network.

In the preferred embodiment, at step 401, where the method 400 selects a task from the plurality of tasks in a linear workflow of the real-time heterogeneous network using a task consideration module 106. In the heterogeneous network an application consists of the plurality of tasks, some of which may be bound to specific layers, while the rest are free to be executed on any layer. Each task of the plurality of tasks has different realizations with different execution time on different layers. Consecutive tasks, if executed on different layers, involve transfer of data from the producer task to the consumer task. A synergistic execution framework needs to harness the cumulative capabilities of different compute elements to achieve best execution performance.

In the preferred embodiment, at step 402, the method 400 considers a realization from a plurality of realizations of the selected task using realization module 108, wherein the plurality of realizations approximate errors of the selected task and a relative quality among the plurality of realizations of the selected task. Quality of a realization is specific to the functionality of the application and also the manner through which the order of operations are realized. Usually, the best possible realization is fixed to have the highest quality of the each task, but the other realizations may add some element of inexactness to the computation and produce outputs with different orders of variations from the accurate one.

In the preferred embodiment, at step 406, the method 400 is defining a realization index based on the realized one or more order of operations of the considered task. Generally, for a workflow let k be the highest number of realizations available for any task, then the quality index of the $i^{th}$ realization of the task is computed as (k−i). Let's take an example, where the task has four realizations. The first realization is the best quality and the fourth realization of the worst quality. At the same time the execution time of the first realization is highest and that the fourth realization is lowest. Quality indices are assigned in the reverse order i.e. the first consideration is assigned quality index of four and the fourth realization is one.

In the preferred embodiment, at step 408, the method 400 analyzes a plurality of configurations for the selected task using a configuration analyzing module, wherein each of the plurality of configurations depends on a plurality of implementations and a plurality of physical parts of the heterogeneous network. Analysis of the plurality of configurations on account of the execution time of the workflow. The execution time of the workflow is computed as the cost of the longest path in the graph, where the cost of the task is defined as the execution time for a configuration and the edge cost as the data transfer latency based on the present network condition. Thus, the selection of a configuration is considered on the cost of highest order of quality of the composition of the plurality of tasks in the workflow.

In the preferred embodiment, at step 410, the method 400 estimates execution time for each of the analyzed plurality of configurations using a decision module 112, wherein the estimation process follows a recursive routine and completes the execution within the predefined deadline on the cost of quality of output. There are two essential components in each of the architecture layers. The decision module 112 tries to optimize the execution time based on various measured values which is obtained from the profiler. Since the execution time of the heterogeneous network is dynamic, the optimal configuration of the workflow is variable. To handle this dynamism, the system 100 determines the configuration at every task invocation point in the workflow.

In the preferred embodiment, at final step 412, the method 400 determines a configuration for the selected task based on the least execution time estimation for each of the plurality of tasks to meet the specified deadlines of the workflow of a real-time heterogeneous network. The decision module 112 of the system 100 chooses exactly one realization for each of the plurality of tasks and schedules the same at an appropriate layer of the heterogeneous network in a manner so that the end-to-end execution of the workflow meets the specified deadline and also the best possible quality of the output of each of the plurality of the tasks of the real-time heterogeneous network. And finally, the decision module 112 determines a configuration for the selected task based on the best output quality for each of the plurality of tasks, and yet meet the specified deadlines of the workflow of a real-time heterogeneous network.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method for determining a configuration of a plurality of tasks to meet the specified deadline of a linear workflow of a real-time heterogeneous network. Often times, while meeting expected application performance in the heterogeneous network, it may possible to have graceful degradation of quality for ensuring timing constraints at the same time. In a multi-layered architecture, where each layer is equipped with multiple computational resources, the time optimization for each of the plurality of tasks can be achieved through approximate computing and analyzing all possible configurations of each task in a workflow within a particular layer.

The embodiments of present disclosure herein addresses unresolved problem of meeting expected application performance of the heterogeneous network as well as guaranteeing quality and ensuring timing constraints at the same time.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof.

The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for determining a configuration of a plurality of tasks to meet a specified deadline of a linear workflow of a real-time heterogeneous network, the method comprising:
   selecting, by a processor, a task from the plurality of tasks in the linear workflow of the real-time heterogeneous network, wherein the real-time heterogeneous network has a multi-layered architecture, and wherein each task of the plurality of tasks has different realizations with different execution times on different layers of the heterogeneous network;
   considering, by the processor, a realization from the plurality of realizations of the selected task, wherein the plurality of realizations approximate errors of the selected task and a relative quality among the plurality of realizations of the selected task, and wherein the relative quality is based on one or more orders of operations performed in the realization to meet the specified deadline;
   defining, by the processor, a realization index based on the considered realization of the selected task of the linear workflow;
   analyzing, by the processor, a plurality of configurations for the selected task, wherein each of the plurality of configurations depends on a plurality of implementations and a plurality of physical parts of the heterogeneous network;
   estimating, by the processor, execution time for each of the analyzed plurality of configurations, wherein the estimation follows a recursive routine and completes the execution within the specified deadline on a cost of quality of output, and wherein the processor optimizes the execution time based on measured values received from a profiler monitoring the plurality of tasks in the linear workflow; and
   determining, by the processor, a configuration for the selected task based on the least execution time estimation for each of the plurality of tasks to meet the specified deadlines of the workflow of a real-time heterogeneous network.

2. The method claimed in claim 1, wherein one or more resources within a layer of the heterogeneous network are homogeneous.

3. The method claimed in claim 1, wherein each of the plurality of realizations depends on one or more limitations of a layer of the heterogeneous network.

4. The method claimed in claim 3, wherein the one or more limitations of the layer includes execution time, power consumption values and quality of output.

5. A system for determining a task configuration to meet specified deadlines of a plurality of tasks of a real-time heterogeneous network, the system comprising:

a processor;

a memory communicatively coupled to the processor and the memory contains instructions that are readable by the processor and, when executed by the processor, cause the processor to:

select a task from the plurality of tasks in a linear workflow of the real-time heterogeneous network, wherein the real-time heterogeneous network has a multi-layered architecture, and wherein each task of the plurality of tasks has different realizations with different execution times on different layers of the heterogeneous network;

consider a realization from the plurality of realizations of the selected task, wherein the plurality of realizations approximate errors of the selected task and a relative quality among the plurality of realizations of the selected task, and wherein the relative quality is based on one or more orders of operations performed in the realization to meet the specified deadline;

analyze a plurality of configurations for the selected task, wherein each of the plurality of configurations depends on a plurality of implementations and a plurality of physical parts of the heterogeneous network;

estimate execution time for each of the analyzed plurality of configurations, wherein the estimation follows a recursive routine and completes the execution within the specified deadline on a cost of quality of output, and wherein the processor optimizes the execution time based on measured values received from a profiler monitoring the plurality of tasks in the linear workflow; and determine a configuration for the selected task based on the least execution time estimation for each of the plurality of tasks to meet the specified deadlines of the workflow of a real-time heterogeneous network.

6. The system claimed in claim 5, wherein one or more resources within a layer of the heterogeneous network are homogeneous.

7. The system claimed in claim 5, wherein each of the plurality of realizations depends on one or more limitations of a layer of the heterogeneous network.

8. The system claimed in claim 7, wherein the one or more limitations of the layer includes execution time, power consumption values and quality of output.

9. A non-transitory computer readable medium storing instructions, which when executed by one or more hardware processors, causes the one or more hardware processors to execute a method for determining a configuration of a plurality of tasks to meet a specified deadline of a linear workflow of a real-time heterogeneous network, the method comprising:

selecting a task from the plurality of tasks in the linear workflow of the real-time heterogeneous network, wherein the real-time heterogeneous network has a multi-layered architecture, and wherein each task of the plurality of tasks has different realizations with different execution time on different layers of the heterogeneous network;

considering a realization from the plurality of realizations of the selected task, wherein the plurality of realizations approximate errors of the selected task and a relative quality among the plurality of realizations of the selected task, and wherein the relative quality is based on one or more orders of operations performed in the realization to meet the specified deadline;

defining a realization index based on the considered realization of the selected task of the linear workflow;

analyzing a plurality of configurations for the selected task, wherein each of the plurality of configurations depends on a plurality of implementations and a plurality of physical parts of the heterogeneous network;

estimating execution time for each of the analyzed plurality of configurations, wherein the estimation follows a recursive routine and completes the execution within the specified deadline on a cost of quality of output, and wherein the one or more hardware processors optimize the execution time based on measured values received from a profiler monitoring the plurality of tasks in the linear workflow; and determining a configuration for the selected task based on the least execution time estimation for each of the plurality of tasks to meet the specified deadlines of the workflow of a real-time heterogeneous network.

\* \* \* \* \*